Figures 1, 2:
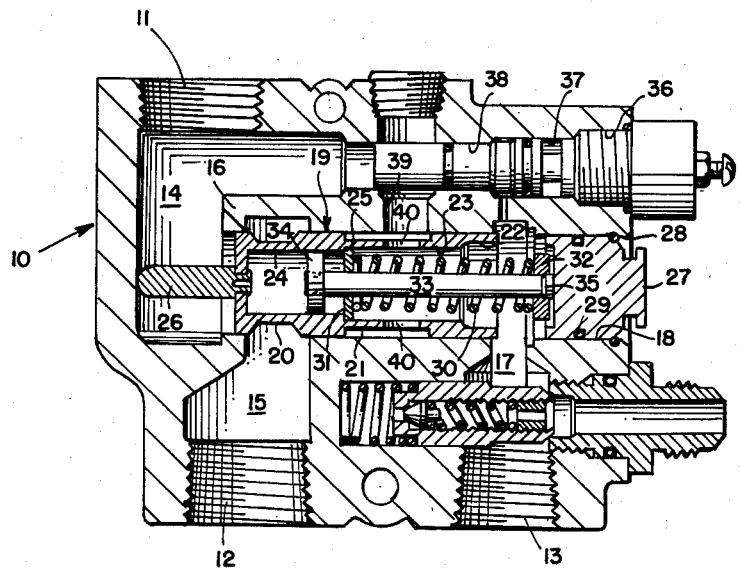

Dec. 17, 1963   J. D. ALLEN   3,114,380
DEMAND TYPE FLOW DIVIDER
Filed July 13, 1961

INVENTOR:
JOHN D. ALLEN
BY
ATT'Y

United States Patent Office 3,114,380
Patented Dec. 17, 1963

3,114,380
DEMAND TYPE FLOW DIVIDER
John D. Allen, South Euclid, Ohio, assignor to Fawick Corporation, a corporation of Michigan
Filed July 13, 1961, Ser. No. 123,770
4 Claims. (Cl. 137—101)

This invention relates to hydraulic valves of the type known as flow dividers which function to divide a stream of liquid under pressure into two streams, one of which is called a controlled flow stream and the other of which is called the excess flow stream.

In a copending application of Allen and Holt, filed July 10, 1961, Serial No. 123,035 for demand type flow divider, there is disclosed a valve mechanism which divides a stream into a controlled flow stream and an excess flow stream with means for materially increasing the controlled flow when a demand for such increase arises. In the normal flow divider, the controlled flow is independent of demand in that stream, and hence the divider must be designed to handle the maximum expected controlled flow. This may result in an unnecessarily large controlled flow during periods when it is not necessary, at the expense of the excess flow which could at times materially benefit from an increased flow. In the divider disclosed in the aforementioned Allen and Holt application, a pressure responsive valve is provided in the controlled flow stream which, upon the attainment of a predetermined pressure therein, opens to increase the flow in the controlled flow stream. The pressure responsive valve, however, operates in conjunction with the self-adjusting valve which normally effects the division of the main stream into the controlled flow and excess flow streams and hence is subject to variations in the operation of the self-adjusting valve.

The principal object of the present invention is to provide a demand type flow divider utilizing a pressure responsive valve in the controlled flow stream wherein said valve is independent of the operation of the principal valve controlling the division of flow.

As a more specific object, this invention seeks to provide a demand type flow divider of an improved character which may be incorporated into existing flow divider valve bodies.

A still further object of this invention is the provision of a flow divider valve of the demand type which is consistent in operation and which can be set to increase the flow in the controlled flow stream at any predetermined pressure therein.

These and other objects of this invention will become apparent from the following detailed description when taken together with the accompanying drawings in which:

FIGURE 1 is a cross-section through a flow divider valve incorporating the demand type feature of this invention; and FIGURE 2 is an enlarged fragmentary section through that portion of the valve of FIGURE 1 which provides the demand feature.

Referring now to FIGURE 1 for a general description of the flow divider valve, in the form in which it may be most frequently used commercially, the valve is comprised of a body 10 having an inlet opening 11 adapted to be connected to a source of fluid under pressure, an excess flow opening 12 and a controlled flow opening 13, the latter two comprising the two streams into which the fluid flowing into the inlet opening is divided. If the flow divider valve is used, for example, on a farm type tractor having a hydraulically operated lift mechanism and a hydraulically operated power steering mechanism, the excess flow opening 12 may be connected to the hydraulically operated lift mechanism and the controlled flow opening 13 may be connected to the power steering mechanism.

Inlet opening 11 is in communication with an inlet chamber 14 which may be cored into the valve body 10 at the time of casting. An excess flow chamber 15 is cored into body 10 adjacent inlet chamber 14 such that the two are separated by a wall 16. A controlled flow chamber 17 is also cored in valve body 10 in a manner to communicate with controlled flow opening 13.

An opening 18 is drilled into body 10 from the right-hand side thereof as viewed in FIGURE 1, said opening extending through wall 16 to receive a piston type modulating valve 19. Said valve has formed thereon an excess flow peripheral groove 20 disposed principally in excess flow chamber 15, and a controlled flow peripheral groove 21 disposed between excess flow chamber 15 and controlled flow chamber 17. The interior of the valve is recessed from the right as viewed in FIGURE 1, the recess being of progressively smaller diameter commencing with a short entrance section 22 extending inwardly from the right hand end as viewed in FIGURE 1 followed by a central section 23 and a final section 24 separated from section 23 by a shoulder 25.

A stop 26 is secured to the left hand end of valve 19 as viewed in FIGURE 1, and cooperates with the left hand wall of inlet chamber 14, as viewed in FIGURE 1, to limit movement of valve 19 in that direction.

The right hand end of opening 18, as viewed in FIGURE 1, is sealed by a plug 27 which is held against movement out of the opening 18 by a snap ring 28 and is sealed with respect to the wall of opening 18 by an O-ring 29. It may be observed that plug 27 does not extend into the controlled flow chamber 17.

Valve 19 is continuously urged to the left, as viewed in FIGURE 1, by a compression spring 30 disposed in sections 22 and 23 of the recess in the valve and acting against a washer 31 which bears against shoulder 25 on valve 19 and reacting against a washer 32 axially fixed in a right hand direction, as viewed in FIGURE 1, on a piston rod 33 disposed centrally of valve 19. Said piston rod 33 extends through a suitable opening in washer 31 into recess section 24 and is there secured to a piston 34 which fits loosely in recess 24 to function as a dash pot for relative movement between the piston 34 and valve 19. Spring 30 normally holds piston rod 33 against plug 27 through washer 32 and a retaining snap ring 35 on the piston rod 33. Valve 19 is thus continuously urged toward inlet chamber 14 by spring 30.

Above bore 18, as viewed in FIGURE 1, and preferably parallel with it, is a smaller bore 36 which has a counter-bore 37 adjacent thereto and a counter-bore 38 adjacent counter-bore 37, counter-bore 38 communicating with the cored inlet chamber 14. A cross-bore 39 connects counter-bore 38 with bore 18 at the region thereof normally in communication with peripheral groove 21 on valve 19. Said valve 19 in turn has cross-bores 40 connecting peripheral groove 21 with recess section 23 in valve 19 and recess section 23, of course, opens upon recess section 22, which in turn opens upon controlled flow chamber 17. Thus the controlled flow stream passes from inlet chamber 14 through counter-bore 38 to cross-bore 39, thence around peripheral groove 21, through cross-bores 40 into the recess sections 23 and 22, thence into controlled flow chamber 17 and out through controlled flow opening 13.

Control for the "controlled" flow is established by a valve 41 which is shown to better advantage in FIGURE 2, said valve 41 has a cylindrical portion 42 disposed in counter-bore 38 and extending across cross-bore 39 into the extension 38' of the cross-bore 38 adjacent to and communicating with inlet chamber 14.

Cylindrical portion 42 thus functions as a valve to prevent direct flow from inlet chamber 14 to cross-bore 39.

Adjacent cylindrical portion 42 is a stepped portion 43 which provides a shoulder 44 adapted to bear against the shoulder 45 connecting counter-bore 37 with counter-bore 38. A second stepped portion 46 fits snugly into counter-bore 37 and is sealed with respect thereto by an O-ring 47.

Counter-bore 36 is threaded to receive a plug 48, the central region of which has an enlarged recess 49 facing valve 41, and a threaded opening 50 extending from recess 49 to the right, as viewed in FIGURE 2, through said plug 48.

Valve 41 has an axial extension 51 on its right hand side, as viewed in FIGURE 2, which telescopes into recess 49 and is sealed with respect thereto by an O-ring 52. A spring 53 is disposed in recess 49 and is compressed between the bottom of said recess and the end of extension 51. Said spring 53 serves to urge valve 41 to the left, as viewed in FIGURE 2, to hold shoulder 44 thereof against shoulder 45 and thereby maintain cylindrical portion 42 in the extension 38' of counter-bore 38.

The controlled flow stream is established through a central opening 54 in the left hand end of cylindrical portion 42, as viewed in FIGURE 2, which is connected by an orifice 55 to cross-bore 39. An axially extending passageway 56 terminating in a cross-bore 57 opening into counter-bore 37 around extension 51 connects recess 54 to counter-bore 37 to establish fluid pressure upon valve 41 in a direction opposite to that produced by the fluid in counter-bore 38. It is contemplated that the two pressures will be exactly balanced so that said valve 41 is independent of pressure in inlet chamber 14.

It may be noted that the stepped portion 43 provides an annular chamber between valve 41 and counter-bore 37 which is sealed with respect to the chamber surrounding extension 51 by O-ring 47. Said chamber 58 is connected to controlled flow chamber 17 by a drilled passage 59 so that chamber 58 is always subjected to the controlled flow stream pressure. This pressure tends to move valve 41 to the right, as viewed in FIGURE 2, while spring 53 acts upon the valve in the opposite direction. Thus when the controlled flow pressure exceeds that exerted by spring 53, valve 41 will move to the right and will withdraw extension 42 from counter-bore 38' to open a direct passage from said counter-bore 38' to cross-bore 39 and thereby materially increase the flow in the controlled flow stream. The amount of such flow is governed by a stop in the form of a screw 60 threaded into the threaded opening 50 and locked in a given axial position by a nut 61.

In a typical installation, spring 53 was adjusted to maintain valve 41 in its closed relation with respect to counter-bore 38' at controlled flow pressures less than 250 pounds per square inch. In this position, the orifice 55, which is the sole connection between counter-bore 38' and cross-bore 39, maintained a controlled flow of around one gallon per minute. When the controlled flow pressure exceeded 250 pounds per square inch, spring 53 was compressed and valve 41 moved out of counter-bore 38' to open the direct passage between said counter-bore 38' and cross-bore 39 by a small amount determined by the position of screw 60. Said screw may be set normally to maintain a controlled flow of about three gallons per minute.

When incorporated into a typical hydraulic system on a fork lift truck, for example, the controlled flow opening 13 is connected to the hydraulically operated power steering system and the excess flow opening 12 is connected to the lift operating system. During such periods when only a low steering effort is required, a pressure of less than 250 pounds per square inch for the hydraulically operated power steering system is sufficient and the flow divider of this invention may supply approximately one gallon per minute to the steering system, leaving an extra two gallons per minute to give added speed to the operation of the lifting mechanism. When an increased steering effort is required, so that more than 250 pounds per square inch is necessary at the controlled flow opening 13, valve 41 is moved to the right, as shown in FIGURE 2, by the excess pressure in chamber 58 and will thereby open a direct passage between counter-bore 38' and cross-bore 39 to increase the flow to the controlled flow opening 13 to approximately three gallons per minute. Thus, the divider of this invention functions as a true "demand type" flow divider since it delivers fluid for steering only when an appreciable amount of steering pressure is required.

Operation of valve 19 is controlled by operation of valve 41 in such manner that a higher rate of controlled flow is effected when the controlled flow pressure is high. Thus although valve 19 is continuously urged toward the left as viewed in FIG. 1 by spring 30, it is urged in the opposite direction by a pressure differential in chambers 14 and 17 which is a function of the rate of flow through the orifice 55 and through such additional opening between counter-bore 38' and cross-bore 39 as may be established by movement of valve 41 to the right as viewed in FIG. 1. Because of this pressure differential, the left-hand end of valve 19, as viewed in FIG. 1, is exposed to full inlet pressure at all times, whereas the right-hand end of valve 19 is exposed to a pressure which is lower than inlet pressure by the amount of the orifice differential pressure. Thus when the rate of flow in the controlled flow stream increases, the force of opposing spring 30 also increases, and when the desired rate of controlled flow is attained, spring 30 is compressed and valve 19 moves to the right. Such movement to the right first establishes communication between inlet chamber 14 and excess flow chamber 15 through wall 16 to provide the excess flow stream. Any tendency of the flow through orifice 55 to increase will cause further movement of valve 19 to the right partially to close or restrict the opening between the right-hand end of valve 19 and chamber 17. However, when pressure in the controlled flow stream, i.e., in chamber 17, increases because of the operation of the device controlled thereby, the pressure differential across valve 19 is decreased, thereby assisting spring 30 to move valve 19 to reduce the excess flow, and valve 41 is moved to establish flow around its end, thus increasing the flow in the controlled flow stream.

It is understood that the foregoing description is merely illustrative of a preferred embodiment of the invention and that the scope of the invention therefore is not to be limited thereto but is to be determined by the appended claims.

I claim:

1. A flow divider comprising a valve body having inlet, excess flow and controlled flow chambers connected respectively to inlet, excess flow and controlled flow openings, a controlled flow modulating valve adapted to admit fluid from said inlet chamber to the excess flow chamber to establish an excess flow stream through the flow divider, said body having a passage connecting the controlled flow chamber with the inlet chamber, said passage including an initial bore and a cross-bore intersecting the initial bore, a valve in said initial bore extending across said cross-bore, said last-mentioned valve having a recess facing the inlet chamber and an orifice connecting the recess with the cross-bore to establish a controlled flow through said last-mentioned valve, resilient means normally urging said last-mentioned valve in a direction to extend said last-mentioned valve across said cross-bore to block flow around said last-mentioned valve, means on said last-mentioned valve responsive to pressure in the controlled flow chamber for counteracting the resilient means to urge said last-mentioned valve to extend only partly across said cross-bore to allow flow around said last-mentioned valve, and means for balancing said last-mentioned valve with respect to inlet chamber pressure.

2. A flow divider as described in claim 1, said last-mentioned means comprising an extension of reduced diameter on said last-mentioned valve, said valve body having a recess to receive said extension and defining a balancing chamber with said extension and said last-mentioned valve, said last-mentioned valve having a passage connecting the recess with the balancing chamber to balance said last-mentioned valve with respect to inlet chamber pressure as aforesaid.

3. A flow divider comprising a valve body having inlet, excess flow and controlled flow chambers connected respectively to inlet, excess flow and controlled flow openings, a controlled flow modulating valve in the valve body adapted to admit fluid from said inlet chamber to the excess flow chamber to establish an excess flow stream through the flow divider, said body having a passage connecting the controlled flow chamber with the inlet chamber, said passage including a bore having a first portion, a second portion thereof having an enlarged diameter with respect to the first portion and a shoulder forming therebetween, said passage having a cross-bore intersecting the first portion thereof, a plug in the second portion of the bore spaced from the shoulder and having a central recess therein facing the shoulder, a controlled flow valve in the bore and having a first section in the first portion of the bore extending across said cross-bore, a second section of enlarged diameter in the second portion of the bore, but of less diameter than the diameter of said second portion, a third section in said enlarged second portion of the bore and sealed with respect thereto, and a fourth section extending into and sealed with respect to the recess in the plug; said second section forming a chamber with the enlarged second portion of the bore, there being a passage in the valve body connecting the last-mentioned chamber with the controlled flow chamber to subject said last-mentioned controlled flow valve to the pressure in said controlled flow chamber, resilient means disposed between the plug and said last-mentioned controlled flow valve acting in opposition to the pressure in said last-mentioned chamber, said last-mentioned controlled flow valve having an orifice connecting the inlet chamber to the cross-bore to establish a controlled flow stream through the flow divider, said plug being axially spaced from the enlarged third section of said last-mentioned controlled flow valve to form a balancing chamber therewith, and said last-mentioned controlled flow valve having a passage connectnig the inlet chamber to the balancing chamber, the effective area of said last-mentioned valve in the balancing chamber being equal to the effective area of said last-mentioned valve exposed to the inlet chamber pressure.

4. A flow divider as described in claim 3, and adjustable stop means extending through the plug from the exterior of the valve body into proximity to the end of the said fourth section of said last-mentioned controlled flow valve to limit movement of said last-mentioned valve under controlled flow pressure.

References Cited in the file of this patent

UNITED STATES PATENTS

| | | |
|---|---|---|
| 1,657,807 | Ray | Jan. 31, 1928 |
| 2,680,447 | Groves | June 8, 1954 |
| 2,995,141 | Hipp | Aug. 8, 1961 |